United States Patent [19]
Yamamoto et al.

[11] Patent Number: 5,891,538
[45] Date of Patent: Apr. 6, 1999

[54] THERMOPLASTIC RESIN COMPOSITION AND LAMINATE COMPRISING THE SAME

[75] Inventors: Yoshihisa Yamamoto; Takafumi Yamato; Tetsuo Shimizu; Takeshi Harada, all of Osaka, Japan

[73] Assignee: Baikin Industries, Ltd., Osaka, Japan

[21] Appl. No.: 633,830

[22] PCT Filed: Oct. 27, 1994

[86] PCT No.: PCT/JP94/01806

§ 371 Date: Apr. 29, 1996

§ 102(e) Date: Apr. 29, 1996

[87] PCT Pub. No.: WO95/11940

PCT Pub. Date: May 4, 1995

[30] Foreign Application Priority Data

Oct. 29, 1993 [JP] Japan .................................. 5-272233

[51] Int. Cl.$^6$ .............................. B29D 22/00; B32B 7/00
[52] U.S. Cl. .......................................... 428/36.9; 525/179
[58] Field of Search ............................ 428/36.9; 525/179

[56] References Cited

U.S. PATENT DOCUMENTS

| 4,548,986 | 10/1985 | Suzuki et al. ............................ 525/179 |
| 4,966,941 | 10/1990 | Subramanian ............................ 525/179 |
| 4,987,017 | 1/1991 | Sato et al. ................................ 525/179 |
| 5,130,201 | 7/1992 | Yoshimura et al. ...................... 525/179 |
| 5,132,368 | 7/1992 | Chapman, Jr. et al. ................. 525/179 |
| 5,159,014 | 10/1992 | Tsutsumi et al. ........................ 525/179 |
| 5,244,961 | 9/1993 | Yu et al. .................................. 525/179 |
| 5,441,782 | 8/1995 | Kawashima et al. ................... 428/36.9 |

FOREIGN PATENT DOCUMENTS

| 64-51459 | 2/1989 | Japan ..................................... 525/179 |
| 3072552 | 3/1991 | Japan . |
| 3185042 | 3/1991 | Japan . |
| 4140585 | 5/1992 | Japan . |
| 4140588 | 5/1992 | Japan . |
| 4224939 | 8/1992 | Japan . |
| 5016304 | 1/1993 | Japan . |
| 5096599 | 4/1993 | Japan . |
| 5193082 | 8/1993 | Japan . |
| 5220906 | 8/1993 | Japan . |
| WO9007555 | 7/1990 | WIPO ..................................... 525/179 |

*Primary Examiner*—Bernard Lipman
*Assistant Examiner*—N. Sarofim

[57] ABSTRACT

A thermoplastic resin composition comprising (i) 5 to 80% by weight of a polyamide resin, (ii) 15 to 90% by weight of a fluororesin and (iii) 1 to 80% by weight of a fluororubber having a tensile modulus at ordinary temperature of not more than 500 Kg/cm$^2$, and a laminated material having a layer formed from the thermoplastic resin composition have excellent chemical resistance.

11 Claims, No Drawings

THERMOPLASTIC RESIN COMPOSITION AND LAMINATE COMPRISING THE SAME

FIELD OF THE INVENTION

The present invention relates to a thermoplastic resin composition and a laminate comprising the same. Particularly, it relates to a material constituting a single-layer substance or a laminate with a fluororesin and/or a polyamide resin in the shaping of a structural material, for example, a hose, a tube, a pipe, a seal, a gasket, a packing, a sheet, a film, a roller, a bottle, a tank and a container (e.g. a dish, a pan, etc.) having excellent chemical resistance to and impermeability of a gasoline, an alcohol, an acid, etc.

DESCRIPTION OF RELATED ART

For automobile fuel piping, various materials have been studied, and metallic materials such as iron are frequently used.

In view of prevention of air pollution, the lowering of weight for the improvement of cost of fuel and the addition of methanol, ethanol or MTBE (methyl tertiary butyl ether) into gasoline have been recently conducted. However, a conventional metal pipe or tube can not meet with difficulty of the lowering of weight because of a large specific gravity of metallic material, and has a problem such as corrosion by the addition of the additional compound such as methanol into gasoline. There has been requested a material for a fuel pipe or tube, which is lightweight, high corrosion resistance, high stability to the fuel and low fuel permeability.

By the way, a fluororesin is used in various fields because of its advantages such as heat resistance, oil resistance, chemical resistance, etc. Also, it has been intensively studied to use the fluororesin as an automobile fuel piping material by utilizing the low fuel permeability. Among the fluororesins, an ethylene/fluorine-containing olefin polymer seems to be optimum as the fluororesin for automobile parts, particularly the fuel pipe or tube because the ethylene/fluorine-containing olefin polymer has not only low fuel permeability, good flexibility, good low-temperature impact resistance and good heat resistance but also low specific gravity, low cost and good processability. However, it is expensive and has a large specific gravity in comparison with a hydrocarbon resin and, therefore, further cost down and lightening of weight are requested.

On the other hand, a polyamide resin has high strength, high toughness, low specific gravity and excellent processability. Particularly, a polyamide resin having a good flexibility (e.g. polyamide 11, 12, 610, etc.) is widely used for a hose, a tube, a pipe, etc., and is frequently used for automobile parts because of the excellent gasoline resistance. However, the pipe or tube made of the polyamide resin has the disadvantages that the fuel permeability of the gasoline containing the additional compound such as methanol is large while it has low specific gravity and no corrosion. There is also a problem that the deterioration of material, such as increase in fuel permeability, decrease in strength, etc. arises for a very small amount of water contained in the fuel and a deteriorated gasoline (sour gasoline) caused by an electronic fuel injection device.

Under these circumstances, an attempt of forming a single-layer or multi-layer tubing using a blend of the fluororesin and polyamide resin is made (Japanese Patent Kokai Publication No. 140588/1992). In the tube of the blend, however, the fuel permeability can be lowered only by about the volume fraction of the contained fluororesin.

On the other hand, the laminating of the fluororesin and the polyamide resin is an effective means for making the use of characteristics such as chemical resistance, low fuel permeability, etc. while controlling the amount of comparatively expensive fluororesin to a minimum essential amount. However, it is particularly difficult for a less adhesive fluororesin to obtain high interlaminar adhesion properties in the laminate. Accordingly, the above publication (i.e. Japanese Patent Kokai Publication No. 140588/1992) discloses the lamination of the blend of the fluororesin and polyamide resin with the polyamide resin, but it does not disclose lamination with the fluororesin itself.

In order to improve the adhesion properties of the fluororesin and polyamide resin, a method for surface treatment of the adherend surface is proposed. Specifically, a chemical process for treating the outer surface of the fluororesin forming inner layer with a chemical treating solution containing a sodium/ammonia complex or a sodium/naphthalene complex, or a physical process such as corona treatment are required and, therefore, this method is too complicated.

A process for producing a laminate having a fluororesin layer and a polyamide layer using an adhesive layer is also proposed (Japanese Patent Kokai Publication Nos. 224939/1992, 16304/1993 and 193082/1993). The fluororesin component which is intensively studied as the material of the inner fluororesin layer or adhesive layer in these publications, i.e. polyvinylidene fluoride or an ethylene/chlorotrifluoroethylene copolymer, has a preferable processing temperature for co-extrusion with the polyamide resin and low fuel permeability, but it is difficult to satisfy good flexibility and low-temperature impact resistance because of high modulus of these fluororesins. Accordingly, an attempt of softening the fluororesin layer and adhesive layer due to the addition of a flexible fluororesin is made. However, this flexible fluororesin has high modulus in comparison with the fluororubber and the large amount must be required so as to obtain a sufficient flexibility. As a result, the fuel permeability is increased.

On the other hand, the ethylene/tetrafluoroethylene copolymer is a fluororesin having the low fuel permeability, good flexibility and good low-temperature impact resistance, which are requested for the automobile fuel piping material. However, the processing temperature is higher by about 100° C. than that of polyamide resin and, therefore, the composition and polyamide resin are thermally deteriorated during the compounding of the adhesive layer composition and during co-extrusion of the fluororesin and polyamide. Accordingly, these publications do not specifically propose the lamination by co-extrusion with the ethylene/tetrafluoroethylene copolymer.

SUMMARY OF THE INVENTION

In order to solve these problems, the present inventors have studied intensively. As a result, it has been found that a thermoplastic resin composition comprising a polyamide resin, a fluororesin and a fluororubber, and a laminate using the thermoplastic resin composition are useful as a material having excellent chemical resistance to and impermeability of a gasoline, an alcohol, an acid, etc., and that the composition and the laminate are effective when used as a shaped material such as a hose, a tube, a pipe, a seal, a gasket, a packing, a sheet, a film, etc. Thus, the present invention has been completed.

The present invention provides a thermoplastic resin composition comprising:

(i) 5 to 80% by weight of a polyamide resin,
(ii) 15 to 90% by weight of a fluororesin, and (iii) 1 to 80% by weight of a fluororubber having a tensile modulus at ordinary temperature of not more than 500 Kg/cm².

The present invention also provide a shaped material wherein at least one layer of constituent layers comprises the above thermoplastic resin composition.

DETAILED DESCRIPTION OF THE INVENTION

The composition of the present invention is superior in flexibility because the fluororubber (iii) is contained, and dispersed state of the respective components constituting the composition are excellent. Therefore, the composition alone can be used as a material such as a hose, a pipe, a tube, a seal, a gasket, a sheet and a film having a excellent chemical resistance to and impermeability of a gasoline, an alcohol, an acid, etc.

It is also possible to use the composition of the present invention after laminating with the polyamide resin in order to increase the strength and to give lightweight and cost down by the lamination. On the other hand, it is also possible to use the composition by laminating with the fluororesin in order to improve further the chemical resistance and impermeability.

In order to utilize both advantages, the composition of the present invention can be used as the material for an adhesive layer in the laminate having the polyamide layer and the fluororesin layer.

As the polyamide resin (i) used for the composition of the present invention, any known aliphatic and aromatic polyamide resins may be used. It is possible to use a polymerization product of lactam, a condensate of diamine and dicarboxylic acid, a polymerization product of amino acid and a copolymer or blend thereof.

Examples of the polyamide (i) include polyamide 6, 66, 46, 11, 12, 610, 612, etc. For the purpose of improving the flexibility, a plasticizer may be formulated in the polyamide resin. A polyamide thermoplastic elastomer such as a polyether ester amide can be also used. The average molecular weight of the polyamide resin (i) is usually from 5,000 to 500,000.

Among these polyamide resins, polyamides 11, 12 and 610 are preferred because of their characteristics required as the material for the tube, hose and pipe for which the composition of the present invention is frequently used.

When the composition of the present invention is used for lamination with the polyamide resin, it is preferred to use the polyamide resin having the same kind as that of the polyamide resin layer to be laminated in view of adhesion properties and co-extrusion processability. When this laminate is molded by co-extrusion, it is preferred to use the polyamide resin having a melt viscosity of from 10 to 100,000 poise at 250° C. under a shear rate of 100 sec⁻¹ in view of adjustment of the melt viscosity of the composition.

As the fluororesin (ii) used for the composition of the present invention, any melt processable fluororesin may be used. Examples of the fluororesin (ii) include a tetrafluoroethylene/fluoroalkyl vinyl ether copolymer (hereinafter referred to as "PFA"), a tetrafluoroethylene/hexafluoropropylene copolymer (hereinafter referred to as "FEP"), an ethylene/tetrafluoroethylene copolymer (hereinafter referred to as "ETFE"), polyvinylidene fluoride (hereinafter referred to as "PVDF"), polychlorotrifluoroethylene (hereinafter referred to as "PCTFE"), etc. The average molecular weight of the fluororesin (ii) is usually from 2,000 to 1,000,000.

It is preferred that PFA is a copolymer of tetrafluoroethylene and at least one of a fluoroalkyl vinyl ether represented by the formula: $CF_2=CF-O-R_f$ ($R_f$ is a fluoroalkyl group having 1 to 10 carbon atoms). PFA preferably comprises 99 to 92% by weight of tetrafluoroethylene and 1 to 8% by weight of the fluoroalkyl vinyl ether.

FEP preferably comprises 96 to 87% by weight of tetrafluoroethylene and 4 to 13% by weight of hexafluoropropylene.

ETFE preferably comprises 90 to 74% by weight of tetrafluoroethylene and 10 to 26% by weight of ethylene.

As long as the essential characteristic of the fluororesin (ii) is not adversely affected, the fluororesin (ii) may contain one or more of other monomers. Examples of the other monomer include tetrafluoroethylene (excluding PFA, FEP and ETFE), hexafluoropropylene (excluding FEP), a fluoroalkyl vinyl ether (excluding PFA), vinylidene fluoride (excluding PVDF), chlorotrifluoroethylene (excluding PCTFE), perfluoroalkyl (having 1 to 10 carbon atoms) ethylene, a perfluoroalkyl (having 1 to 10 carbon atoms) allyl ether and a compound represented by the formula:

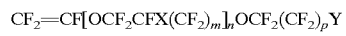

wherein X is a fluorine atom or a trifluoromethyl group; Y is halogen; m is a number of 0 or 1 (provided that X is limited to fluorine when m is 1); n is a number of 0 to 5; and p is a number of 0 to 2.

Among these fluororesins, a vinylidene fluoride polymer or an ethylene/fluorine-containing olefin copolymer having a comparatively low melting point is preferred when a composition of the polyamide resin and fluororubber is produced by the compounding.

The vinylidene fluoride polymer is polyvinylidene fluoride (PVDF), and a resinous copolymer comprising vinylidene fluoride (VDF) and at least one fluorine-containing monomer copolymerizable with vinylidene fluoride. Typical examples of the fluorine-containing monomer copolymerizable with vinylidene fluoride include tetrafluoroethylene (TFE), hexafluoropropylene (HFP), chlorotrifluoroethylene (CTFE), hexafluoroisobutylene, hexafluoroacetone, pentafluoropropylene, trifluoroethylene, vinyl fluoride, fluoroalkyl vinyl ether, etc. In the vinylidene fluoride polymer, the amount of vinylidene fluoride is at least 80% by mole.

The ethylene/fluorine-containing olefin copolymer is a resinous polymer wherein the molar ratio of ethylene to (TFE and/or CTFE) is from 10:90 to 60:40, and a third fluorine-containing monomer copolymerizable with them is contained in the amount of 0 to 15% by mole based on the total amount of ethylene and TFE and CTFE. Examples of the third fluorine-containing monomer include at least one compound represented by the formula $CH_2=CZ(CF_2)_wZ$, $CF_2=CZ(CF_2)_wZ$, $CF_2=CFO(CF_2)_wZ$ (Z is a hydrogen atom or a fluorine atom; and w is a number of 1 to 8) or $CH_2=C(CF_3)_2$.

When blending with the polyamide and co-extruding with the polyamide, it is preferred to use the vinylidene fluoride polymer or ethylene/fluorine-containing olefin copolymer having a melt viscosity of 10 to 100,000 poise at 250° C. under a shear rate of 100 sec⁻¹ so as to obtain a sufficient melt processability within the compounding and molding temperature range giving no significant deterioration of the polyamide resin.

Among them, the ethylene/fluorine-containing olefin copolymer having a melt viscosity of 10 to 100,000 poise at 250° C. under a shear rate of 100 sec⁻¹ is optimum for preparing, by multi-layer co-extrusion with the polyamide resin, a fuel pipe or tube, because this copolymer is superior in flexibility, low-temperature impact resistance, heat resistance, etc. with maintaining low fuel permeability. The ethylene/tetrafluoroethylene copolymer wherein the molar ratio of ethylene to TFE is from 10:90 to 38:62 and the third fluorine-containing monomer copolymerizable with them is contained in the amount of about 0.1 to 5% by mole based on the total amount of ethylene and TFE is particularly preferable because the amount of comparatively expensive third fluorine-containing monomer can be reduced without deteriorating the characteristic of the ethylene/fluorine-containing olefin copolymer (cf. Japanese Patent Kokoku Publication No. 58615/1987).

Examples of the fluororubber (iii) used for the composition of the present invention include elastomeric copolymers such as a vinylidene fluoride copolymer, an ethylene/fluorine-containing olefin copolymer, a tetrafluoroethylene/propylene copolymer, etc. The tensile modulus at ordinary temperature (23° C.) of the fluororubber (iii) is not more than 500 Kg/cm$^2$, preferably not more than 300 Kg/cm$^2$, more preferably not more than 100 Kg/cm$^2$, most preferably from 5 to 50 Kg/cm$^2$. When the tensile modulus exceeds 500 Kg/cm$^2$, the modulus of the composition itself can not be effectively decreased, which gives lower impact resistance. The term "tensile modulus at ordinary temperature" used herein means a modulus calculated by a slope of the initial microstrain part of a stress-strain curve of a usual tensile test according to ASTM D638. In the composition having the low modulus such as about 100 Kg/cm$^2$ or less, a stress at low elongation represented by JIS K6301 (e.g. stress at 100% elongation) can be used in place of the tensile modulus. The average molecular weight of the fluororubber (iii) is normally from 2,000 to 1,000,000.

Among them, the vinylidene fluoride elastomeric copolymer is a copolymer of vinylidene fluoride (VDF) and at least one fluorine-containing monomer copolymerizable with vinylidene fluoride [e.g. tetrafluoroethylene (TFE), hexafluoropropylene (HFP), chlorotrifluoroethylene (CTFE), hexafluoroisobutylene, hexafluoroacetone, pentafluoropropylene, trifluoroethylene, vinyl fluoride, fluoroalkyl vinyl ether, etc.]. Examples of the vinylidene fluoride elastomeric copolymer include a VDF/HFP copolymer, a VDF/CTFE copolymer, a terpolymer of VDF/TFE/(HFP or CTFE), etc. in the VDF/HFP copolymer, it is preferred that the amount of VDF is from 40 to 80% by mole and that of HFP is from 20 to 60% by mole. In the VDF/CTFE copolymer, it is preferred that the amount of VDF is from 40 to 80% by mole and that of CTFE is from 20 to 60% by mole. In the terpolymer of VDF/TFE/(HFP or CTFE), it is preferred that the amount of VDF is from 39 to 80% by mole, that of TFE is from 1 to 40% by mole and that of HFP or CTFE is from 10 to 60% by mole.

The ethylene/fluorine-containing olefin elastomeric copolymer is, for example, an elastomeric copolymer having such a composition that the amount of ethylene is from about 30 to 90% by mole (preferably from about 40 to 80% by mole), that of TFE and/or CTFE is from about 0.1 to 20% by mole and that of the third fluorine-containing monomer is from about 10 to 60% by mole. As the third fluorine-containing monomer, at least one compound represented by the formula $CH_2=CZ(CF_2)_wZ$, $CF_2=CZ(CF_2)_wZ$, $CF_2=CFO(CF_2)_wZ$ (Z is a hydrogen atom or a fluorine atom; and w is a number of 1 to 8) or $CH_2=C(CF_3)_2$ can be used.

The tetrafluoroethylene/propylene elastomeric copolymer is an elastomeric copolymer wherein the molar ratio of tetrafluoroethylene to propylene is from 95:5 to 30:70, and a third fluorine-containing monomer copolymerizable with them is contained in the amount of 0 to 15% by mole based on the total amount of tetrafluoroethylene and propylene. As the third fluorine-containing monomer, at least one compound represented by the formula $CH_2=CZ(CF_2)_wZ$, $CF_2=CZ(CF_2)_wZ$, $CF_2=CFO(CF_2)_wZ$ (Z is a hydrogen atom or a fluorine atom; and w is a number of 1 to 8) or $CH_2=C(CF_3)_2$ can be used.

In order to inhibit a decrease in strength of the composition due to the addition of the fluororubber (iii), it is also preferred to use a fluorine-containing segmented polymer comprising (A) a fluorine-containing elastomeric polymer segment and (B) a fluorine-containing non-elastomeric polymer segment as the fluororubber (iii). Typical examples of the fluorine-containing segmented polymer include a fluorine-containing segmented polymer obtained by successively polymerizing monomers which constitute each of the fluorine-containing elastomeric polymer segment (A) and the fluorine-containing non-elastomeric polymer segment (B) so that, when at least two monomers having a radically polymerizable unsaturated bond are radically polymerized in the presence of an iodide compound having iodine bonded to carbon and a radical initiator, at least two kinds of polymer segments are formed in the carbon-iodine bonds of the iodide compound [cf. Japanese Patent Kokoku Publication No. 4728/1983 (corresponding to U.S. Pat. No. 4,158,678, the disclosure of which is incorporated in the present specification as the reference)].

Preferably, in the fluorine-containing segmented polymer, a perhalo hydrocarbon having 1 to 16 carbon atoms wherein at least one of the halogen atoms is an iodine atom and the other halogen atoms is a fluorine atom, or a combination of fluorine and chlorine atoms (provided that when a chlorine atom exists, the number of the chlorine atoms is not larger than that of fluorine atoms and, at the same time, more than one chlorine atom is not bonded to one carbon atom) is used as the iodide compound, and the fluorine-containing segmented polymer is a straight-chain block copolymer wherein the weight ratio of the segment (B) to segment (A) is from 5:95 to 60:40.

Such a fluorine-containing segmented polymer has excellent characteristics as the thermoplastic elastomer while maintaining good flexibility because of high degree of blocking, and also have a sufficient heat resistance during melt processing such as compounding and co-extrusion with the ethylene/fluorine-containing olefin copolymer because it contains no thermally unstable structure.

Preferred examples of the polymer constituting the fluorine-containing elastomeric polymer segment (A) include a copolymer of vinylidene fluoride/hexafluoropropylene or pentafluoropropylene/tetrafluoroethylene, a copolymer of vinylidene fluoride/hexafluoropropylene or pentafluoropropylene, a copolymer of vinylidene fluoride/chlorotrifluoroethylene, a copolymer of perfluoroalkyl vinyl ether/tetrafluoroethylene and/or vinylidene fluoride. Among them, an elastomeric copolymer having the molecular weight of from 30,000 to 1,000,000 selected from the copolymer of vinylidene fluoride/hexafluoropropylene or pentafluoropropylene/tetrafluoroethylene (molar ratio=45~90:5~50:0~35) or the copolymer of perfluoroalkyl (having 1 to 3 carbon atoms) vinyl ether/tetrafluoroethylene/vinylidene fluoride (molar ratio=15~75:0~85:0~85) is particularly preferred.

Preferable fluorine-containing non-elastomeric polymer segment (B) is a vinylidene fluoride copolymer or an ethylene/fluorine-containing olefin copolymer. When blending with the polyamide and co-extruding with the polyamide, the vinylidene fluoride copolymer or ethylene/fluorine-containing olefin copolymer having a melt viscosity of 10 to 100,000 poise at 250° C. under a shear rate of 100 $sec^{-1}$ and a molecular weight of 3,000 to 400,000 is preferred so as to obtain a sufficient melt fluidity within the compounding and molding temperature range having no considerable deterioration of the polyamide resin.

It is not necessarily required that the fluorine-containing non-elastomeric polymer segment (B) in the fluorine-containing segmented polymer has the same component as that of the fluororesin used for the composition and/or the fluororesin laminated with the composition, but it is preferred to have the same component so as to improve the dispersed state of the composition and interlaminar adhesion properties with the fluororesin during the lamination. For example, when melt compounding and/or laminating with the ethylene/tetrafluoroethylene copolymer in which the molar ratio of ethylene to TFE is from 10:90 to 38:62, and which contains a third fluorine-containing monomer copolymerizable with them is contained in the amount of 0.1 to 5% by mole based on the total amount of ethylene and TFE [cf. Japanese Patent Kokoku Publication No. 58615/1987 (corresponding to U.S. Pat. No. 4,677,175, the disclosure of which is incorporated in the present specification as the reference)], it is preferred to use a fluorine-containing segmented polymer comprising an ethylene/tetrafluoroethylene copolymer containing the third fluorine-containing monomer as the fluorine-containing non-elastomeric polymer segment [cf. Japanese Patent Kokai Publication No. 33313/1984].

In the thermoplastic resin composition of the present invention, the amount of the polyamide resin (i) is from 5 to 80% by weight. When the amount is smaller than 5% by weight, the resulting composition is inferior in mechanical strength and is insufficient in view of the cost and specific gravity. When the amount is larger than 80% by weight, the resulting composition has lower chemical, fuel and oil resistance and higher fuel permeability. When it is laminated with the polyamide resin and/or fluororesin by co-extrusion, sufficient interlaminar adhesion properties are obtained and, therefore, the range from 5 to 50% by weight is preferred.

The amount of the fluororesin (ii) is from 15 to 90% by weight. When the amount is smaller than 15% by weight, the resulting composition has lower chemical, fuel and oil resistance and higher fuel permeability. When the amount is larger than 90% by weight, the resulting composition is inferior in mechanical strength and is insufficient in view of the cost and specific gravity. When it is laminated with the polyamide resin and/or fluororesin by co-extrusion, sufficient interlaminar adhesion properties are obtained and, therefore, the range from 45 to 90% by weight is preferred.

The amount of the fluororubber (iii) is from 1 to 80% by weight. When the amount is smaller than 1% by weight, the compatibility between the components (i) and (ii) is insufficient and the composition is inferior in strength. When the amount is larger than 80% by weight, the cost is high and it is inferior in heat resistance. When it is laminated with the polyamide resin and/or fluororesin by co-extrusion, sufficient interlaminar adhesion properties are obtained and, therefore, the range from 1 to 50% by weight is preferred.

In the composition of the present invention, a block or graft copolymer having an affinity to both polyamide resin and fluororesin, e.g. a block or graft copolymer containing a monomer having an epoxy group or a carboxylic (anhydride) group and a (meth)acrylic polymer component may be mixed in the amount of 1 to 30% by weight based on the total amount of the composition of the present invention so as to improve the dispersed state of the polyamide resin (i), fluororesin (ii) and fluororubber (iii) as well as the interlaminar adhesion properties during the lamination with the polyamide resin layer and/or fluororesin layer. The molecular weight of the polymer component containing the monomer having the epoxy group or carboxylic (anhydride) group is from 1,000 to 200,000, that of the (meth)acrylic polymer component is from 1,000 to 200,000 and that of the block or graft copolymer is from 2,000 to 400,000. The amount of the monomer having the epoxy group or carboxylic (anhydride) group is 1 to 30% by weight of the block or graft copolymer.

In the preparation of the resin composition of the present invention, a known mixing process is normally used. For example, the respective components can be preliminary mixed using a mixer such as a V type blender, a tumbler, a Henschel mixer, etc. and mixed using a melt mixing device such as a twin-screw extruder, followed by pelletizing.

The pellet of the composition of the present invention thus obtained can be molded into a shaped material having a desired shape using a normally used molding machine for thermoplastic resin, such as an injection molding machine, a compression molding machine, an extruder, etc. It is preferred to use extrusion so as to obtain, in good productivity, a hose, a tube and a pipe, for which the composition of the present invention is frequently used. If necessary, it is possible to obtain a laminate having at least one layer comprising the composition of the present invention. The co-extrusion is a preferred method so as to obtain the laminate in good productivity.

The composition of the present invention may contain an inorganic or organic filer which is normally used, for example, fibrous reinforcing agents such as a glass fiber, a carbon fiber, a ceramic fiber, a potassium titanate fiber, an aramid fiber, etc.; inorganic fillers such as calcium carbonate, talc, mica, clay, carbon powder, graphite, glass beads, etc.; heat resistant resins such as polyimide, etc.; colorants; flame retardants, etc., so far as the object of the present invention is not adversely affected. The amount thereof is normally from 1 to 70% by weight of the composition.

The composition of the present invention may be used in the laminate.

In the laminate using the layer of the composition of the present invention, it is not necessarily required that the fluororesin and polyamide resin used for the composition are the same as the fluororesin and/or polyamide resin to be laminated with the composition, but it is preferred to use the same ones so as to improve the interlaminar adhesion properties during laminating.

When the laminate using the layer of the composition of the present invention is utilized as the automobile fuel piping material, it is preferred to produce a laminate which has a three-layer structure of the polyamide layer/composition layer/fluororesin layer so as to reduce the amount of the expensive fluororesin and so as to satisfy the low fuel permeability, good flexibility and good low-temperature impact resistance.

In order to prevent the fuel from igniting due to a spark generated by an inner friction of the fuel circulating in the piping or a friction between the fuel and a pipe wall, it is preferred to produce a laminate wherein a fluororesin having a destaticizing function imparted by formulating the conductive powder such as carbon powder is used for the fluororesin layer in this three-layer structure, or a four-layer structure laminate wherein a fluororesin layer having a destaticizing function is provided as the layer which is adjacent to the fuel on the inside of a fluororesin layer having no destaticizing function.

It is also preferred to produce a four (or more)-layer laminate having a structure that the amount of the polyamide resin (or amount of the fluororesin) of the composition constituting the respective layers inclines in an intermediate layer of two or more layers, by dividing the intermediate layer of the composition of the present invention into two or more layers, and providing a layer of the composition containing the polyamide resin in a higher amount within the range of the present invention at the polyamide resin layer side while providing a layer of the composition containing the fluororesin in higher amount within the range of the present invention at the fluororesin layer side.

Examples of the polyamide resin for forming the polyamide resin layer are the same as those described with respect to the polyamide resin (i). Examples of the fluororesin for forming the fluororesin layer are the same as those described wit respect to the fluororesin (ii). Preferably, the thickness of the polyamide resin layer in the laminate is from 0.01 to 10 mm, that of the composition layer is from 0.01 to 1 mm and that of the fluororesin layer is from 0.01 to 5 mm.

It is also possible to coat this laminate with a resin or rubber for the purpose of protection or contamination prevention.

PREFERRED EMBODIMENT OF THE INVENTION

The following Examples further illustrate the present invention in detail but are not to be construed to limit the scope thereof. The abbreviations used in Examples are as follows:

Explanation of abbreviations

| Abbreviation | Type | | | Melt viscosity[1] (poise) | Tensile modulus[2] (kg/cm$^2$) |
|---|---|---|---|---|---|
| Polyamide resin | | | | | |
| PA1 | Polyamide 12 | molecular weight: 15,000 | containing no plasticizer | $1 \times 10^3$ | — |
| PA2 | Polyamide 12 | molecular weight: 35,000 | containing plasticizer | $1 \times 10^4$ | — |
| PA3 | Polyamide 12 | molecular weight: 20,000 | containing no plasticizer | $3 \times 10^3$ | — |
| Fluororesin | | | | | |
| FP1 | Ethylene/tetrafluoroethylene copolymer E/TFE molar ratio = 35:65, melting point: 225° C. | | | $2 \times 10^4$ | — |
| FP2 | Ethylene/tetrafluoroethylene copolymer E/TFE molar ratio = 45:55, melting point: 257° C. | | | — | — |
| Fluororubber | | | | | |
| FE1 | VDF/TFE/HFP copolymer VDF/TFE/HFP molar ratio = 50:20:30 | | | $8 \times 10^2$ | 25 |
| FE2 | Fluorine-containing segmented polymer (B)/(A) weight ratio 15:85, melting point: 220° C. | | | $3 \times 10^4$ | 31 |
| FE3[3] | Fluorine-containing segmented polymer (B)/(A) weight ratio = 25:75, melting point: 220° C. | | | $3 \times 10^4$ | 36 |
| Others | | | | | |
| G3 | Rezeda GP300[4] manufactured by Toa Gosei Kagaku Kogyo Co., Ltd. | | | — | — |

Note:
[1]Melt viscosity: The melt viscosity at 250° C. under a shear rate of 100 sec$^{-1}$ was measured using a capillograph (nozzle diameter: 2 mm, nozzle length: 10 mm) manufactured by Toyo Seiki Co., Ltd.
[2]Tensile modulus: The tensile modulus was measured according to ASTM D638.
[3]FE2 and FE3 indicate a polymer in which the fluorine-containing elastomeric polymer segment (A) is a VDF/TFE/HFP copolymer and the fluorine-containing non-elastomeric polymer segment (B) is an ethylene/TFE/HFP copolymer.
[4]Rezeda GP300: a graft polymer comprising epoxy-modified polystyrene (backbone)-polymethyl methacrylate (branch).

EXAMPLES 1 TO 18 AND COMPARATIVE EXAMPLES 1 TO 14

(Production of composition)

After a polyamide resin, a fluororesin and a fluororubber were premixed in the amount as shown in Table I, the mixture was extruded by a twin-screw extruder whose cylinder temperature was set at 220° to 240° C. to obtain pellets.

(Preparation of multi-layer sheet)

Each of the compositions AF1 to AF18 was molded by a compression molding at 240° C. to prepare a sheet of the composition. This sheet as the intermediate layer was interposed between a sheet of a polyamide resin and a sheet of a fluororesin which were separately molded. After preheating at 240° C. for 3 minutes, a pressure of 20 Kg/cm$^2$ was applied to form a three-layer sheet (thickness of polyamide resin layer: 0.5 mm, thickness of composition layer: 0.5 mm, thickness of fluororesin layer: 0.5 mm). Adhesion properties between the respective layers were measured by gripping the polyamide layer and the fluororesin layer of this three-layer sheet. The results are shown in Tables II and III.

(Preparation of multi-layer tube)

A multi-layer tube comprising each of the compositions AF19 to AF29 as the intermediate layer, the polyamide resin as the outer layer and the fluororesin as the inner layer (outer diameter: 8 mm, inner diameter: 6 mm, thickness of polyamide resin layer: 0.7 mm, thickness of composition layer: 0.1 mm, thickness of fluororesin layer: 0.2 mm) was molded by co-extrusion of three types of layers using a multi-manifold die. The resulting multi-layer tube was subjected to the following tests. The results are shown in Table IV.

Testing method

1) Tensile strength and elongation at break

The tensile strength and elongation at break at room temperature were measured using the respective tubes according to ASTM D638.

2) Adhesion strength

A test piece having a width of 5 mm was cut from the respective tubes, and then the adhesion strength between the respective layers was measured by a 180 degree peeling test at room temperature.

3) Low-temperature impact resistance

The impact resistance at −40° C. was determined from the number of the broken test pieces to number of the tested pieces (10 pieces) according to SAE-J844.

4) Fuel permeation rate

The respective tubes were cut into a piece of 30 cm and commercially available gasoline/methanol (weight ratio= 85:15) was charged in the interior of the cut tube to seal both ends. The fuel permeation rate was measured by a change in weight of this tube at 60° C.

TABLE I

| No. | Polyamide resin Type | Weight % | Fluororesin Type | Weight % | Fluororubber Type | Weight % | Others Type | Weight % | Remarks |
|---|---|---|---|---|---|---|---|---|---|
| AF1 | PA1 | 10 | FP1 | 70 | FE2 | 20 | | | Example 1 |
| AF2 | PA1 | 20 | FP1 | 50 | FE2 | 30 | | | Example 2 |
| AF3 | PA1 | 15 | FP1 | 40 | FE2 | 45 | | | Example 3 |
| AF4 | PA1 | 45 | FP1 | 30 | FE2 | 25 | | | Example 4 |
| AF5 | PA1 | 25 | FP1 | 20 | FE2 | 55 | | | Example 5 |
| AF6 | PA1 | 0 | FP1 | 50 | FE2 | 50 | | | Comparative Example 1 |
| AF7 | PA1 | 50 | FP1 | 0 | FE2 | 50 | | | Comparative Example 2 |
| AF8 | PA1 | 15 | FP1 | 10 | FE2 | 75 | | | Comparative Example 3 |
| AF9 | PA1 | 70 | FP1 | 10 | FE2 | 20 | | | Comparative Example 4 |
| AF10 | PA1 | 19 | FP1 | 66 | FE2 | 10 | G3 | 5 | Example 6 |
| AF11 | PA1 | 29 | FP1 | 47 | FE2 | 19 | G3 | 5 | Example 7 |
| AF12 | PA1 | 43 | FP1 | 38 | FE2 | 14 | G3 | 5 | Example 8 |
| AF13 | PA1 | 25 | FP1 | 28 | FE2 | 42 | G3 | 5 | Example 9 |
| AF14 | PA1 | 52 | FP1 | 19 | FE2 | 24 | G3 | 5 | Example 10 |
| AF15 | PA1 | 48 | FP1 | 47 | FE2 | 0 | G3 | 5 | Comparative Example 5 |
| AF16 | PA1 | 48 | FP1 | 0 | FE2 | 47 | G3 | 5 | Comparative Example 6 |
| AF17 | PA1 | 72 | FP1 | 9 | FE2 | 14 | G3 | 5 | Comparative Example 7 |
| AF18 | PA1 | 19 | FP1 | 9 | FE2 | 67 | G3 | 5 | Comparative Example 8 |
| AF19 | PA3 | 20 | FP1 | 64.2 | FE2 | 15.8 | | | Example 11 |
| AF20 | PA3 | 20 | FP1 | 46.7 | FE2 | 33.3 | | | Example 12 |
| AF21 | PA3 | 25 | FP1 | 55 | FE2 | 15 | G3 | 5 | Example 13 |
| the same as above (AF21) | | | | | | | | | Example 14 |
| AF22 | PA3 | 15 | FP1 | 35 | FE2 | 50 | | | Example 15 |
| AF23 | PA3 | 30 | FP1 | 55 | FE2 | 15 | | | Example 16 |
| AF24 | PA3 | 20 | FP1 | 64.2 | FE1 | 15.8 | | | Example 17 |
| AF25 | PA3 | 20 | FP1 | 64.2 | FE3 | 15.8 | | | Example 18 |
| AF26 | PA3 | 25 | FP1 | 0 | FE2 | 75 | | | Comparative Example 9 |
| AF27 | PA3 | 30 | FP1 | 70 | FE2 | 0 | | | Comparative Example 10 |
| AF28 | PA3 | 3 | FP1 | 60 | FE2 | 27 | | | Comparative Example 11 |
| AF29 | PA3 | 70 | FP1 | 10 | FE2 | 20 | | | Comparative Example 12 |

TABLE II

Results of multi-layer sheet

| | | Example No. | | | | | Comparative Example No. | | | |
|---|---|---|---|---|---|---|---|---|---|---|
| | | 1 | 2 | 3 | 4 | 5 | 1 | 2 | 3 | 4 |
| First layer | Fluororesin | | | | | | | | | |
| | Type | FP1 | FP1 | FP1 | FP1 | FP1 | FP1 | FP1 | FP1 | FP1 |
| Second layer | Type Polyamide resin | AF1 | AF2 | AF3 | AF4 | AF5 | AF6 | AF7 | AF8 | AF9 |
| | Type | PA1 | PA1 | PA1 | PA1 | PA1 | | PA1 | PA1 | PA1 |
| | Weight % Fluororesin | 10 | 20 | 15 | 45 | 25 | 0 | 50 | 15 | 70 |
| | Type | FP1 | FP1 | FP1 | FP1 | FP1 | FP1 | | FP1 | FP1 |
| | Weight % Fluororubber | 70 | 50 | 40 | 30 | 20 | 50 | 0 | 10 | 10 |
| | Type | FE2 | FE2 | FE2 | FE2 | FE2 | FE2 | FE2 | FE2 | FE2 |
| | Weight % | 20 | 30 | 45 | 25 | 55 | 50 | 50 | 75 | 20 |
| Third layer | Polyamide resin | | | | | | | | | |
| | Type | PA1 | PA1 | PA1 | PA1 | PA1 | PA1 | PA1 | PA1 | PA1 |
| Adhesion properties | Adhesion strength | O | O | O | O | O | X | X | X | X |
| | Peeled part | 1[1)] | 1[1)] | 1[1)] | 1[1)] | 1[1)] | 1–2[2)] | 1–2[2)] | 1–2[2)] | 1–2[2)] |

Note:
[1)]1: peeled off in the first layer
[2)]1–2: peeled off between fist and second layers

TABLE III

Results of multi-layer sheet

| | | Example No. | | | | | Comparative Example No. | | | |
|---|---|---|---|---|---|---|---|---|---|---|
| | | 6 | 7 | 8 | 9 | 10 | 5 | 6 | 7 | 8 |
| First layer | Fluororesin | | | | | | | | | |
| | Type | FP1 | FP1 | FP1 | FP1 | FP1 | FP1 | FP1 | FP1 | FP1 |
| Second layer | Type Polyamide resin | AF10 | AF11 | AF12 | AF13 | AF14 | AF15 | AF16 | AF17 | AF18 |
| | Type | PA1 | PA1 | PA1 | PA1 | PA1 | PA1 | PA1 | PA1 | PA1 |
| | Weight % Fluororesin | 19 | 29 | 43 | 25 | 52 | 48 | 48 | 72 | 19 |
| | Type | FP1 | FP1 | FP1 | FP1 | FP1 | FP1 | | FP1 | FP1 |
| | Weight % Fluororubber | 66 | 47 | 38 | 28 | 19 | 47 | 0 | 9 | 9 |
| | Type | FE2 | FE2 | FE2 | FE2 | | | FE2 | FE2 | FE2 |
| | Weight % Other | 10 | 19 | 14 | 42 | 24 | 0 | 47 | 14 | 67 |
| | Type | G3 | G3 | G3 | G3 | G3 | G3 | G3 | G3 | G3 |
| | Weight % | 5 | 5 | 5 | 5 | 5 | 5 | 5 | 5 | 5 |
| Third layer | Polyamide resin | | | | | | | | | |
| | Type | PA1 | PA1 | PA1 | PA1 | PA1 | PA1 | PA1 | PA1 | PA1 |
| Adhesion | Adhesion strength | O | O | O | O | X | X | X | X | |

TABLE III-continued

| | | Results of multi-layer sheet | | | | | | | |
|---|---|---|---|---|---|---|---|---|---|
| | | Example No. | | | | | Comparative Example No. | | |
| | | 6 | 7 | 8 | 9 | 10 | 5 | 6 | 7 | 8 |
| proper-ties | Peeled part | 1[1)] | 1[1)] | 1[1)] | 1[1)] | 1[1)] | 1–2[2)] | 1–2[2)] | 1–2[2)] | 1–2[2)] |

Note:
[1)]1: peeled off in the first layer
[2)]1–2: peeled off between fist and second layers

TABLE IV

| | | Results of multi-layer tube Example No. | | | | | | | |
|---|---|---|---|---|---|---|---|---|---|
| | | 11 | 12 | 13 | 14 | 15 | 16 | 17 | 18 |
| Inner layer | Fluororesin Type | FP1 | FP1 | FP1 | FP2 | FP1 | FP1 | FP1 | FP1 |
| Intermediate layer | Type | AF19 | AF20 | AF21 | AF21 | AF22 | AF23 | AF24 | AF25 |
| | Polyamide resin Type | PA3 | PA3 | PA3 | PA3 | PA3 | PA3 | PA3 | PA3 |
| | Weight % | 20 | 20 | 25 | 25 | 15 | 30 | 20 | 20 |
| | Fluororesin Type | FP1 | FP1 | FP1 | FP1 | FP1 | FP1 | FP1 | FP1 |
| | Weight % | 64.2 | 46.7 | 55 | 55 | 35 | 55 | 64.2 | 64.2 |
| | Fluororubber Type | FE2 | FE2 | FE2 | FE2 | FE2 | FE2 | FE1 | FE2 |
| | Weight % | 15.8 | 33.3 | 15 | 15 | 50 | 15 | 15.8 | 15.8 |
| | Other Type | | | G3 | G3 | | | | |
| | Weight % | | | 5 | 5 | | | | |
| Outer layer | Polyamide resin Type | PA2 | PA2 | PA2 | PA2 | PA2 | PA2 | PA2 | PA2 |
| Tensile strength | kg/m$^2$ | 380 | 361 | 356 | 351 | 335 | 343 | 331 | 386 |
| Elongation at break | % | 290 | 256 | 210 | 210 | 252 | 230 | 252 | 285 |
| Low-temperature impact resistance | Number of broken test pieces/10 | 1 | 0 | 1 | 2 | 2 | 2 | 2 | 1 |
| Fuel permeation rate | g/m$^2$ · day | 28 | 30 | 27 | 23 | 29 | 22 | 31 | 25 |
| Adhesion strength | | | | | | | | | |
| Inner layer/ intermediate layer | (kg/5 mm) | 1 | 1 | 0.8 | 0.7 | 0.6 | 0.5 | 0.7 | 1 |
| Intermediate layer/outer layer | (kg/5 mm) | >1 | >1 | >1 | >1 | 0.7 | >1 | >1 | >1 |

| | | Comparative example No. | | | | | |
|---|---|---|---|---|---|---|---|
| | | 9 | 10 | 11 | 12 | 13 | 14 |
| Inner layer | Fluororesin Type | FP1 | FP1 | FP1 | FP1 | FP1 | Single layer of PA2 |
| Intermediate layer | Type Polyamide resin | AF26 | AF27 | AF28 | AF29 | None | |
| | Type | PA3 | PA3 | PA3 | PA3 | | |
| | Weight % | 25 | 30 | 3 | 70 | | |

TABLE IV-continued

| | | | | | | | |
|---|---|---|---|---|---|---|---|
| | Fluororesin | | | | | | |
| | Type | | FP1 | FP1 | FP1 | | |
| | Weight % | 0 | 70 | 60 | 10 | | |
| | Fluororubber | | | | | | |
| | Type | FE2 | | FE2 | FE2 | | |
| | Weight % | 75 | 0 | 27 | 20 | | |
| | Other | | | | | | |
| | Type | | | | | | |
| | Weight % | 0 | 0 | 0 | 0 | | |
| Outer layer | Polyamide resin | | | | | | |
| | Type | PA2 | PA2 | PA2 | PA2 | PA2 | |
| Tensile strength | kg/m² | 306 | 369 | 315 | 365 | 325 | 371 |
| Elongation at break | % | 210 | 250 | 205 | 261 | 201 | 290 |
| Low-temperature impact resistance | Number of broken test pieces/10 | 6 | 10 | 10 | 10 | 10 | 0 |
| Fuel permeation rate | g/m² · day | 35 | 25 | 28 | 29 | 28 | >200 |
| Adhesion strength | | | | | | | |
| Inner layer/intermediate layer | (kg/5 mm) | 0.2 | 0.5 | >1 | <0.1 | — | — |
| Intermediate layer/outer layer | (kg/5 mm) | >1 | >1 | <0.1 | >1 | — | — |

Effect of the Invention

According to the present invention, there can be provided a material which is suitable for parts having excellent chemical resistance to and low fuel permeability of gasoline, a methanol-containing gasoline, a synthetic oil, an alcohol, an acid, etc., for example, a hose, a tube, a pipe, a seal, a gasket, a packing, a sheet, a film, etc.

What is claimed is:

1. A thermoplastic resin composition comprising:
   (i) 5 to 80% by weight of a polyamide resin,
   (ii) 15 to 90% by weight of a fluororesin, and
   (iii) 1 to 80% by weight of a fluororubber having a tensile modulus at ordinary temperature of not more than 500 Kg/cm²,
   wherein (ii) and (iii) are not grafted together.

2. A thermoplastic resin composition comprising:
   (i) 5 to 50% by weight of a polyamide resin,
   (ii) 45 to 90% by weight of a fluororesin, and
   (iii) 1 to 50% by weight of a fluororubber having a tensile modulus at ordinary temperature of not more than 500 Kg/cm²,
   wherein (ii) and (iii) are not grafted together.

3. The thermoplastic resin composition according to claim 1 or 2, wherein the fluororubber (iii) is a fluorine-containing segmented polymer obtained by successively polymerizing monomers which constitute (A) a fluorine-containing elastomeric polymer segment and (B) a fluorine-containing non-elastomeric polymer segment so that, when at least two monomers having a radically polymerizable unsaturated bond are radically polymerized in the presence of an iodide compound having iodine bonded with carbon and a radical initiator, at least two polymer segments are formed in the carbon-iodine bonds of the iodide compound.

4. The thermoplastic resin composition according to claim 1 or 2, wherein the fluororesin (ii) is an ethylene/fluorine-containing olefin copolymer.

5. The thermoplastic resin composition according to claim 4, wherein the fluororesin (ii) is an ethylene/fluorine-containing olefin copolymer whose melt viscosity at 250° C. under a shear rate of 100 sec$^{-1}$ is from 10 to 100,000 poise.

6. The thermoplastic resin composition according to claim 1 or 2, wherein the fluororesin (ii) is an ethylene/tetrafluoroethylene copolymer in which a molar ratio of ethylene to tetrafluoroethylene is from 10:90 to 38:62 and a third fluorine-containing monomer capable of copolymerizing with ethylene and tetrafluoroethylene is contained in an amount of about 0.1 to 5% by mole based on the total amount of ethylene and tetrafluoroethylene.

7. The thermoplastic resin composition according to claim 1 or 2, each of the polyamide resin (i), fluororesin (ii) and fluororubber (iii) has a melt viscosity of 10 to 100,000 poise at 250° C. under a shear rate of 100 sec$^{-1}$.

8. A shaped material comprising at least one layer which comprises the composition of claim 1 or 2.

9. A tubular shaped material obtained by co-extrusion, wherein at least one layer in constituent layer comprises the composition of claim 1 or 2.

10. A laminate which is a tubular shaped material obtained by co-extrusion and comprising a three-layer structure of a polyamide resin layer; a composition layer of the composition of claim 1 or 2 and a fluororesin layer.

11. The thermoplastic resin composition according to claim 1 or 2, wherein the fluororubber (iii) comprises a vinylidene fluoride copolymer, tetrafluoroethylene copolymer, hexafluoropropylene copolymer, tetrafluoropropylene copolymer, or an ethylene/fluoride-containing olefin copolyer.

* * * * *

UNITED STATES PATENT AND TRADEMARK OFFICE
CERTIFICATE OF CORRECTION

PATENT NO. : 5,891,538
DATED : April 6, 1999
INVENTOR(S) : Yoshihisa Yamamoto, et. al.

It is certified that error appears in the above-indentified patent and that said Letters Patent is hereby corrected as shown below:

Title page, item [73], Assignee: change "Baikin Industries, Ltd." to -- Daikin Industries, Ltd.--.

Signed and Sealed this

Sixteenth Day of November, 1999

Attest:

Q. TODD DICKINSON

Attesting Officer

Acting Commissioner of Patents and Trademarks